US005225297A

United States Patent [19]
Garcia-Alvarado et al.

[11] Patent Number: 5,225,297
[45] Date of Patent: Jul. 6, 1993

[54] COPPER VANADIUM BRONZ INTERCALATION ELECTRODES FOR LITHIUM SECONDARY BATTERIES

[75] Inventors: Flaviano Garcia-Alvarado, Eatontown; Jean-Marie Tarascon, Martinsville, both of N.J.

[73] Assignee: Bell Communications Research, Inc., Livingston, N.J.

[21] Appl. No.: 839,393

[22] Filed: Feb. 20, 1992

[51] Int. Cl.[5] ............................................. H01M 6/18
[52] U.S. Cl. .................................... 429/220; 423/593
[58] Field of Search ........................ 429/220; 423/593

[56] References Cited

FOREIGN PATENT DOCUMENTS 0123670 9/1981 Japan .................................. 429/220
0089070 5/1985 Japan .................................. 429/220

OTHER PUBLICATIONS

"$\omega$-Li$_x$V$_2$O$_5$—a new electrode material for rechargeable lithium batteries", C. Delmas et al., *Journal of Power Sources*, 34 (1991), 113-118.

"On the Preparation and Characterization of a New Polymorph of V$_2$O$_5$", J. M. Cocciantelli et al., *Journal of Solid State Chemistry* (1991), 497-502.

"Crystal chemistry of electrochemically inserted Li$_x$V$_2$O$_5$", J. M. Cocciantelli et al., *Journal of Power Source*, 34 (1991), 103-111.

"Rechargeable Copper Vanadate Cathodes for Lithium Cell", Yoji Sakurai et al., *Journal of the Electrochemical Society*, 135 (1988), 32-36.

*Primary Examiner*—Olik Chaudhuri
*Assistant Examiner*—M. Nuzzolillo
*Attorney, Agent, or Firm*—Leonard Charles Suchyta; Lionel N. White

[57] ABSTRACT

Copper vanadium bronzes suitable for use in positive intercalation electrodes in lithium secondary batteries are prepared by partial oxidative removal of copper ions from $\beta$- and $\epsilon$-Cu$_y$V$_2$O$_5$ bronzes. A preferred one of the resulting electrode materials is capable of intercalating up to about 1.4 Li per vanadium to yield a theoretical energy density of about 1200 Wh/Kg.

14 Claims, 5 Drawing Sheets

COPPER VANADIUM BRONZE INTERCALATION ELECTRODES FOR LITHIUM SECONDARY BATTERIES

BACKGROUND OF THE INVENTION

This invention relates to secondary (rechargeable) lithium batteries which utilize vanadium oxide intercalation compounds as the positive battery electrode. In particular, the invention provides means for improving the performance and energy density of such batteries through the use of a new class of intercalation electrodes comprising copper vanadium bronzes.

Rapid growth in the use of electrical products, ranging from electronics instrumentation, such as sophisticated telecommunication equipment and computers, to powered vehicles, has generated a wide-spread requirement for self-contained power sources and means for renewable energy storage. Therefore, there is a critical need for low-cost, rechargeable energy storage devices (batteries) that have high energy densities and can deliver power reliably at a constant voltage over many recharge cycles.

Due to their favorable weight advantage and significant energy densities, the lithium intercalation batteries have been extensively studied, and substantial investigation has been carried out with such devices comprising vanadium oxide cathodes. Promising results have been obtained with the $V_2O_5$ class of cathode compounds and much recent work has been conducted to improve the capacity and other performance characteristics of these materials. Of particular interest are attempts to improve the capacity of the positive electrode vanadium oxides to intercalate lithium ions, the primary determinative of energy density in these rechargeable batteries.

Several phases of the Li-based vanadium oxide system derived by room temperature insertion of lithium ions into the various $V_2O_5$ structures have been characterized by X-ray diffraction examination. The $\alpha$-, $\epsilon$-, and $\delta$-$Li_xV_2O_5$ phases have been shown to have Li levels of $0<x<0.1$, $0.35<x<0.5$, and $0.9<x<1$. Some investigators, (C. Delmas et al., *Journal of Power Sources*, 34 (1991) 113-118) have achieved higher Li intercalation, i.e., in the range of $2 \leq x \leq 3$, by means of abnormally excessive discharge of $V_2O_5$-based cells to derive an $\omega$-$Li_xV_2O_5$ phase composition. The achievement of such desirable $V_2O_5$ phases have, for the most part, required electrochemical processing of fabricated $Li/V_2O_5$ cells, however. As a result, there has been no practical means for obtaining economically useful amounts of these improved materials. The more recent development of a $\gamma'$ phase of $V_2O_5$ by chemical oxidation of $\gamma$-$Li_xV_2O_5$ (J. M. Cocciatelli et al., *Journal of Solid State Chemistry*, 93 (1991) 497-502, has shown promise as a means for achieving an effective level of Li intercalation which has been targeted as at least one Li per vanadium in the electrode formula.

SUMMARY OF THE INVENTION

In the present invention, we have found the means to provide effective vanadium oxide positive electrodes for lithium secondary batteries through oxidative removal of copper from advantageously structured phases of copper vanadium bronze compounds. These selected bronzes are the monoclinic, substantially three-dimensional $\beta$-phase and the apparently layered $\epsilon$-phase compounds of the general formula, $Cu_yV_2O_5$. A preferred derivative of the latter phase structure has provided reversible intercalation of about 1.4 Li per vanadium at an average of 2.8 volts to yield an unprecedented theoretical energy density of 1200 Wh/kg.

The precursor $\beta$- and $\epsilon$-phase copper bronzes were obtained by direct synthesis at about 650° C. according to known procedure. Depending upon the stoichiometric ratio of the reactant Cu and $V_2O_5$ powders, the resulting $Cu_yV_2O_5$ bronzes assumed the $\beta$-phase (y$\simeq$0-.3-0.6) or the $\epsilon$-phase (y$\simeq$0.85-1.0). Refluxing a selected bronze in a solution of active oxidizing agent, such a $Br_2$ or $NO_2BF_4$, removes copper from the compound in varying amounts, depending on the time and severity of treatment. Carried to its conclusion, the oxidation process can yield $V_2O_5$ polymorphs, $\beta'$- and $\epsilon'$-$V_2O_5$, that are substantially free of copper (e.g., $Cu_{0.006}V_2O_5$) and have the rudimentary three-dimensional or layered structure of the corresponding precursor bronze.

The removal of copper from the $Cu_yV_2O_5$ compounds by oxidation apparently provides a better opportunity for Li to intercalate the interstitial space within the basic compound structure while decreasing the molecular weight of the compounds. This leads to improved energy density when the material is used as a battery electrode. There appears also to be countervailing effect, however, in that excessive copper removal, as in the $\beta'$- and $\epsilon'$-polymorphs, hinders intercalation, probably due to constriction of the open structures normally maintained, at least in part, by the presence of Cu ions. It is preferable, therefore, to control the extent of oxidation to yield copper content in an electrode $Cu_yV_2O_5$ material to y$\simeq$0.05-0.1 for $\beta$-phase and y$\simeq$0.1-0.4 for the $\epsilon$-phase compounds.

THE DRAWING

The present invention will be described with reference to the accompanying drawing of which:

Figure 4:
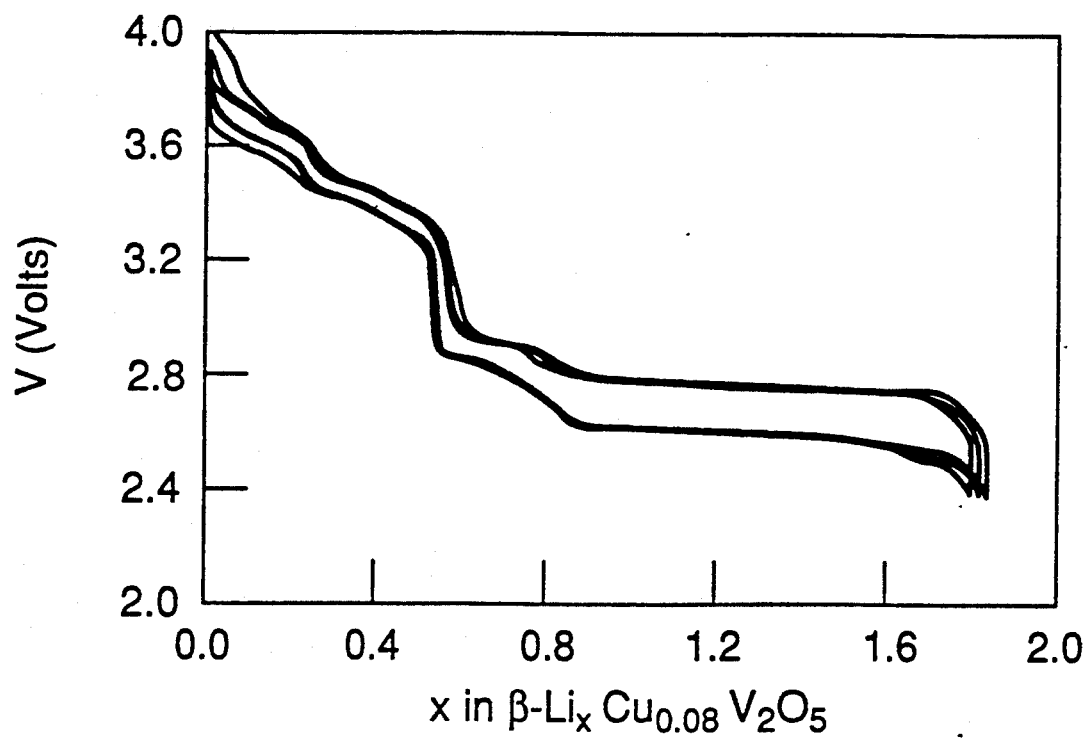
Figure 5:
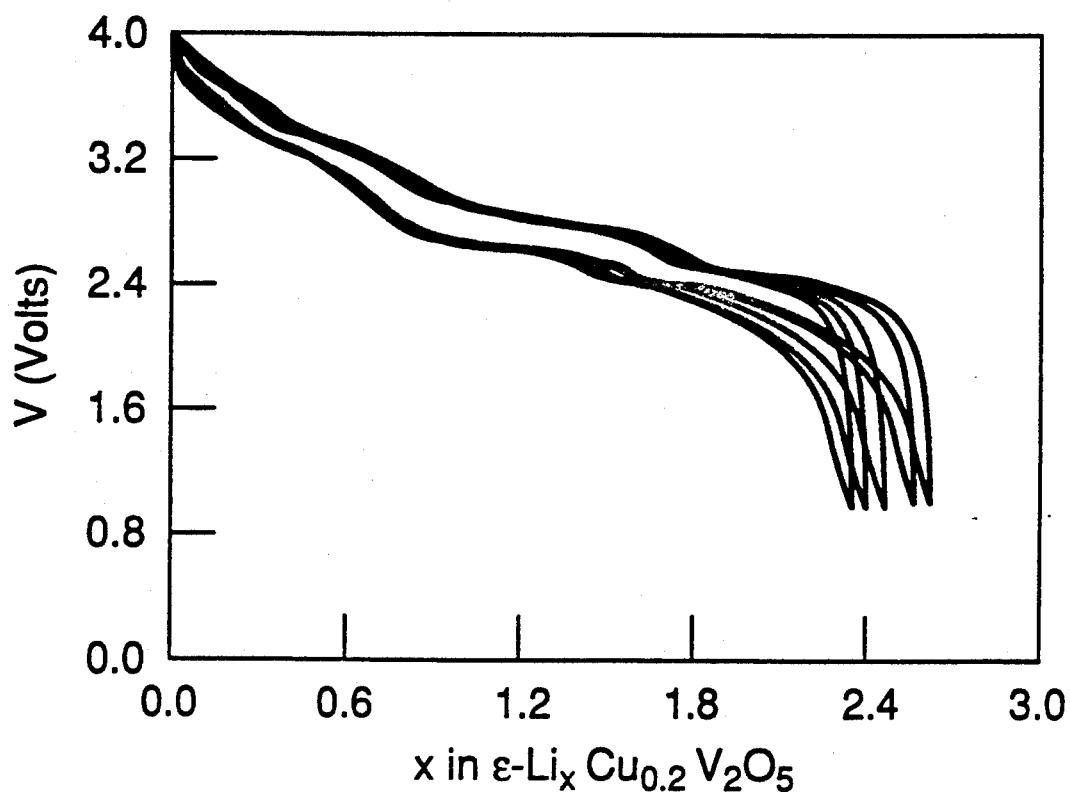

FIG. 4 is a graph of test results of a $\beta$-phase $Cu_yV_2O_5$ cathode of the invention plotting voltage output and recharging characteristics against the level of lithium in the intercalated cathode composition; and FIG. 5 is a graph of test results of a $\epsilon$-phase $Cu_yV_2O_5$ cathode of the invention plotting voltage output and recharging characteristics against the level of lithium in the intercalated cathode composition.

DESCRIPTION OF THE INVENTION

The $Cu_yV_2O_5$ bronze compounds from which the improved intercalation electrode materials of the present invention are derived were readily prepared by direct reaction of stoichiometric amounts of pure ($\simeq$99.5%) Cu and $V_2O_5$ powders in a nitrogen atmosphere at about 630° C. for a period of 3-5 hours. The products resulting from this initial sintering were pulverized and annealed under the same conditions prior to characterization. These reactions are generally conducted under non-oxidizing conditions in order to avoid the formation of $CuV_2O_6$.

Figure 1:
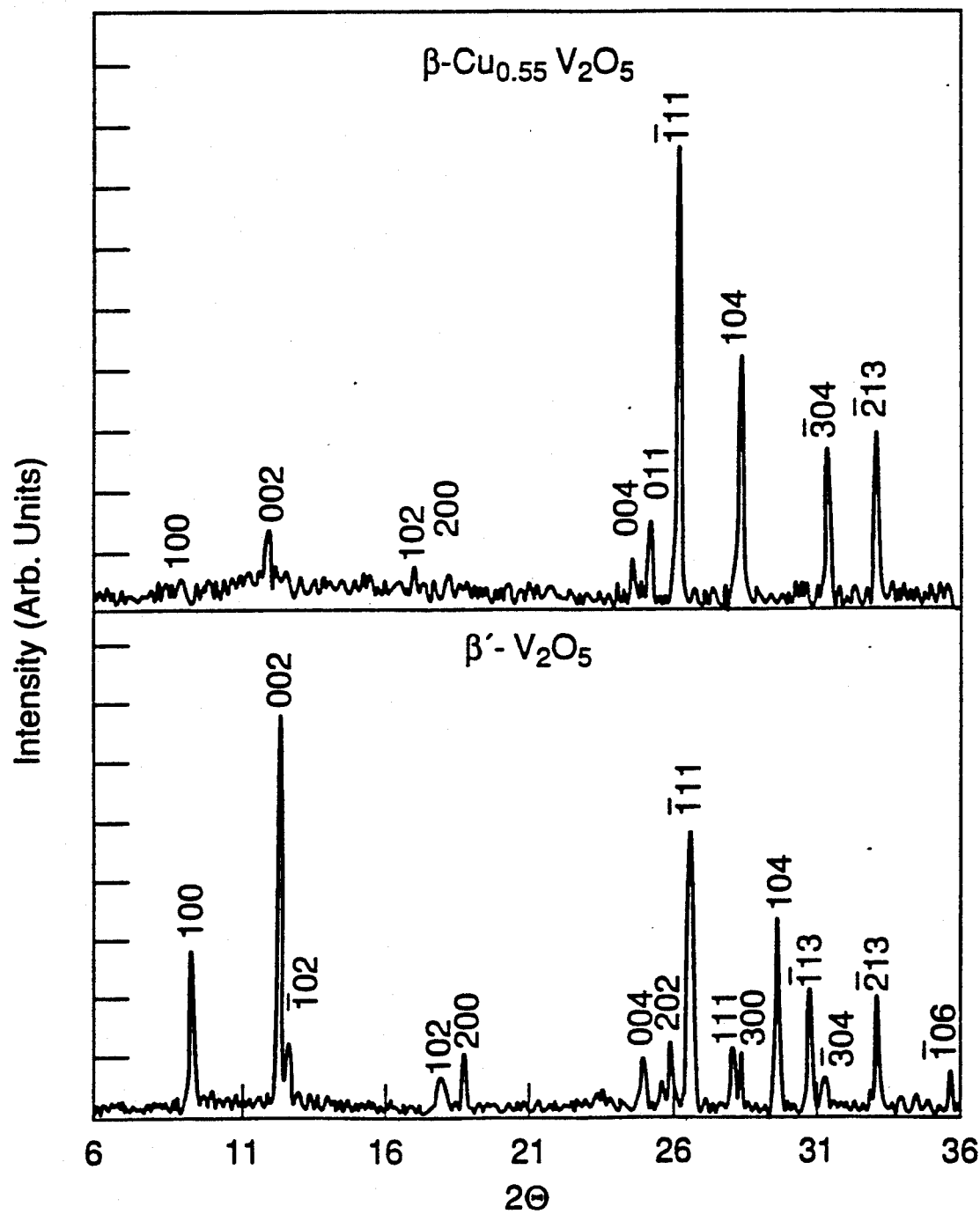
FIG. 1 is a depiction of comparative X-ray diffraction patterns of $\beta$-$Cu_yV_2O_5$ compounds involved in the present invention.
Figure 3:
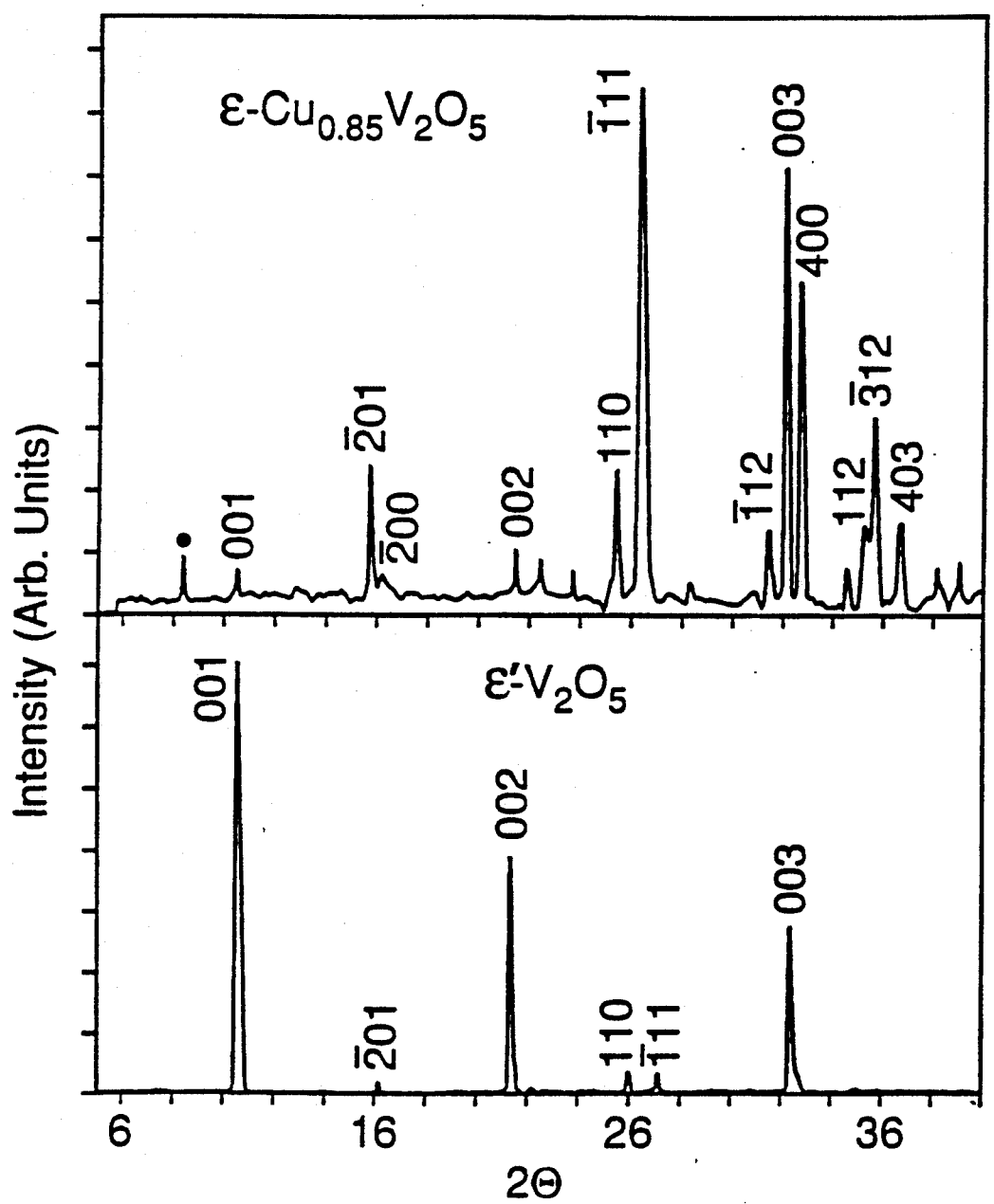
FIG. 3 is a depiction of comparative X-ray diffraction patterns of $\epsilon$-$Cu_yV_2O_5$ compounds involved in the present invention.

X-ray powder diffractometry utilizing Cu(Kα₁) (1.54059 Å) radiation revealed that the stoichiometrically derived nominal $y=0.4$ and 0.6 bronzes, $Cu_{0.4}V_2O_5$ and $Cu_{0.55}V_2O_5$, adopted the three-dimensional $\beta$ structure, while the nominal $y=0.9$ material, $Cu_{0.85}V_2O_5$, had the layered structure of the $\epsilon$-phase. Comparative X-ray diffraction patterns of $\beta$-$Cu_{0.55}V_2O_5$ and its substantially copper-free polymorph, $\beta'$-$V_2O_5$ are depicted in FIG. 1. Similar comparative patterns of $\epsilon$-$Cu_{0.85}V_2O_5$ and its $\epsilon'$-$V_2O_5$ polymorph are depicted in FIG. 3.

Samples of the precursor compounds were treated with a selection of oxidizing agents under varying conditions to remove portions of the interstitial copper and obtain $\beta$-$Cu_yV_2O_5$ and $\epsilon$-$Cu_yV_2O_5$ intercalation materials having a range of retained copper. These resulting copper-depleted compounds and the original vanadium bronzes were then utilized as positive electrodes with lithium anodes in standard battery test cells to determine the efficacy of lithium intercalation, as well as the charge cycling characteristics of the battery combinations.

Oxidation of the precursor compounds followed the same general process wherein about 200–300 mg of a sample was stirred for 24 hrs under reflux in an acetonitrile or anhydrous $CCl_4$ solution of the selected oxidizing agent. The degree of oxidation and copper removal was controlled primarily by the strength of the oxidizing agent which was normally used in an amount about 25% in excess of the stoichiometric equivalent of the desired copper removal. The addition of heat provided a further level of control. In the exemplary processing of the precursor bronzes, oxidizing agents of increasing strength were employed, namely $I_2$, $Br_2$, $NOBF_4$, and $NO_2BF_4$.

Results of the sample processing indicate that copper removal from the layered $\epsilon$-phase material was accomplished under less vigorous conditions than from the more enclosed framework of the $\beta$-phase compounds. The ultimate removal of substantially all copper to derive the $\beta$-polymorph, for example, required a repeated 3-day processing with a three-fold excess of the strongest $NO_2BF_4$ reducing agent at about 82° C., while the same results were obtained from a single such processing of the $\epsilon$-$Cu_{0.85}V_2O_5$ precursor. Other representative results of the processing provided copper levels in the $\epsilon$-phase materials at $y=0.4$ with $I_2$ at 82° C., $y=0.2$ with $Br_2$ at 77° C., $y=0.08$ with $NO_2BF_4$ at 82° C., and $y=0.02$ with an excess $NO_2BF_4$ at room temperature. $\beta$-$Cu_yV_2O_5$ compounds were derived from the $\beta$-$Cu_{0.55}V_2O_5$ compound at $y=0.25$ with $Br_2$ at room temperature, $y=0.08$ with $Br_2$ at 77° C., and $y=0.04$ with $NO_2BF_4$ at 82° C.

At the conclusion of oxidation processing, a sample was filtered from the reaction mixture, washed with the reagent solvent, and dried at about 120° C. When $Br_2$ in $CCl_4$ was used as the oxidation medium, a further washing with ethanol was employed to eliminate any $CuBr_2$ formed during the reaction. The copper constituency of a recovered compound was then determined by Rutherford backscattering spectroscopy with 2.2 MeV He++ ions. A positive electrode for testing as part of a battery cell was thereafter prepared by pressing into the form of an 8 mm diameter pellet a mixture of about 10–15 mg of the $Cu_yV_2O_5$ sample, 10% by wt carbon black to improve electrode conductivity, and 1% by wt ethylene propylene diene terpolymer as a binder. The pellet was then annealed for about an hour at 100° C. under vacuum during which any hydrate water removed. Such heating of the pelletized electrode material is optional, however, since the presence of such water appears to have little effect upon the electrode performance.

Figure 2:
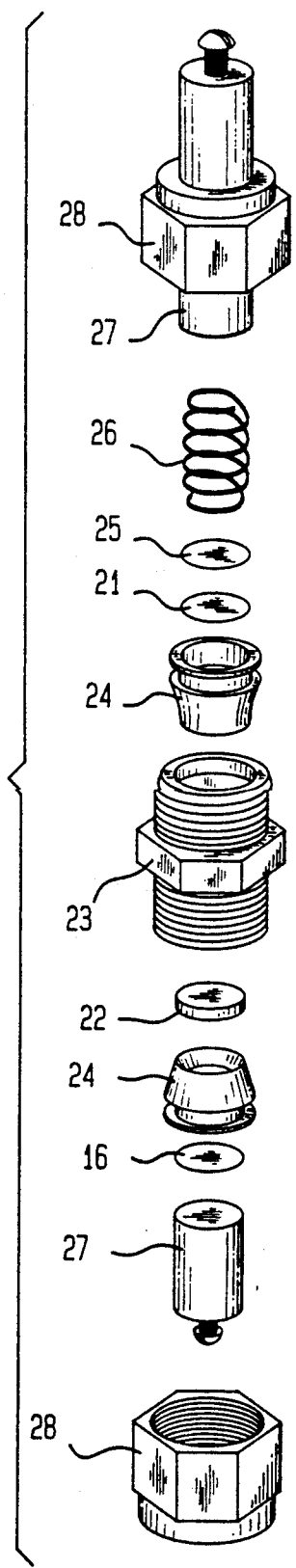
FIG. 2 is an exploded view of a test cell apparatus employed to test the efficacy of a cathode of intercalation compound prepared according to the invention.

A conventional Swagelock test cell for examining the intercalation kinetics of a sample electrode is generally depicted in FIG. 2. This device comprises a body fitting 23 in which are assembled insulating polypropylene inserts 24 and the active cell elements consisting of the sample positive electrode 16, an anode, or negative electrode, 21 of lithium foil or lithium-plated stainless steel, and an intermediate separator 22 of glass cloth, porous polyolefin, or the like saturated with an appropriate electrolyte. A stainless steel backing plate 25 and compression spring 26 are added and the assembly is completed with stainless steel plungers 27 mounted in and electrically insulated from end caps 28. When caps 28 are threaded upon body 23, the electrolyte and electrode elements are brought into firm active contact to form the test cell.

Each of the pelleted electrode samples prepared from the various $Cu_yV_2O_5$ materials were assembled for testing with lithium foil anodes in Swagelock cells. These test assemblies were prepared in a helium atmosphere using glass paper separators saturated with an electrolyte of 1M solution of $LiClO_4$ in 50:50 ethylene carbonate and diethoxyethane. A completed test cell was then operated through a number of discharge/charge cycles at a rate of about 0.4 mA/cm² and the lithium content in the $Li_xCu_yV_2O_5$ formed during discharge cycles was plotted over the range of about 1–4 volts. These plots graphically depict such representative performance characteristics as the extent of polarization of the charges and the ability of the cell to maintain high charge and discharge current densities. The general efficacy of the cell, and of the positive electrode in particular, appears in the degree of lithium intercalation and the limited voltage difference between the charge and discharge cycles.

From the testing of the present $Cu_yV_2O_5$ electrode materials there appeared significant differences in the level of lithium intercalation with changes in the copper content. In both the $\beta$- and $\epsilon$-structured compounds, the ability of a electrode to intercalate Li was seriously hampered by the extreme lack of copper, as appears in the $\beta'$- and $\epsilon'$-polymorphs. A general improvement in the polarization along with an increase in level of lithium intercalation occurs, however, with moderate oxidation removal of copper from both the precursor structures. Copper contents that effectively improve the performance of these copper vanadium bronzes as secondary lithium battery electrodes have been found to be within the ranges of $y=0.05$–$0.1$ for the $\beta$-$Cu_yV_2O_5$ compounds and $y=0.1$–$0.4$ for the $\epsilon$-$Cu_yV_2O_5$. Plots of the particularly preferred $\beta$-$Cu_{0.08}V_2O_5$ and $\epsilon$-$Cu_{0.2}V_2O_5$ materials over a number of recharge cycles appear in FIGS. 3 and 4. As shown, these compounds exhibit desirable polarization characteristics and achieve admirable Li intercalation levels of about 0.9 Li per vanadium for the $\beta$ and an initial 1.4 Li per vanadium, with a sustained 1.2 Li after 50 cycles, for the $\epsilon$-phase material.

It is expected that the skilled artisan may achieve some additional improvements in these characteristics by means of minor variations in the conditions of oxidative processing of the copper vanadium bronzes as described herein. Such routine practices are nonetheless considered to be within the scope of the present invention as set out in the appended claims.

What is claimed is:

1. A secondary battery comprising a lithium negative electrode and an opposing positive electrode comprising a material capable of intercalating lithium ions.
   characterized in that
   said positive electrode material comprises a copper vanadium bronze selected from the group consisting of:
   a) compounds having the formula $\beta\text{-}Cu_yV_2O_5$ wherein $0 < y \leq 0.55$ and
   b) compounds having the formula $\epsilon\text{-}Cu_yV_2O_5$ wherein $0 < y \leq 0.85$.

2. A battery according to claim 1
   characterized in that
   said positive electrode material comprises a copper vanadium bronze selected from the group consisting of:
   a) compounds having the formula $\beta\text{-}Cu_yV_2O_5$ wherein $0.05 \leq y \leq 0.1$; and
   b) compounds having the formula $\epsilon\text{-}Cu_yV_2O_5$ wherein $0.1 \leq y \leq 0.4$.

3. A battery according to claim 1
   characterized in that
   said positive electrode material comprises a copper vanadium bronze selected from the group consisting of:
   a) a compound having the formula $\beta\text{-}Cu_yV_2O_5$ wherein $y \approx 0.08$; and
   b) a compound having the formula $\epsilon\text{-}Cu_yV_2O_5$ wherein $y \approx 0.2$.

4. An electrode material suitable for intercalating lithium ions in a secondary battery
   characterized in that
   said electrode material comprises a copper vanadium bronze selected from the group consisting of:
   a) compounds having the formula $\beta\text{-}Cu_yV_2O_5$ wherein $0 < y \leq 0.55$; and
   b) compounds having the formula $\epsilon\text{-}Cu_yV_2O_5$ wherein $0 < y \leq 0.85$.

5. An electrode material according to claim 4
   characterized in that
   said copper vanadium bronze is selected from the group consisting of:
   a) compounds having the formula $\beta\text{-}Cu_yV_2O_5$ wherein $0.05 \leq y \leq 0.1$; and
   b) compounds having the formula $\epsilon\text{-}Cu_yV_2O_5$ wherein $0.1 \leq y \leq 0.4$.

6. A electrode material according to claim 4
   characterized in that
   said copper vanadium bronze is selected from the group consisting of:
   a) a compound having the formula $\beta\text{-}Cu_yV_2O_5$ wherein $y \approx 0.08$; and
   b) a compound having the formula $\epsilon\text{-}Cu_yV_2O_5$ wherein $y \approx 0.2$.

7. The method of preparing a copper vanadium bronze electrode material suitable for intercalating lithium ions in a secondary battery
   characterized in that
   said method comprises oxidizing for a time sufficient to remove copper ions from the structural framework thereof a copper vanadium bronze selected from the group consisting of:
   a) compounds having the formula $\beta\text{-}Cu_yV_2O_5$; and
   b) compounds having the formula $\epsilon\text{-}Cu_yV_2O_5$.

8. The method according to claim 7
   characterized in that
   said copper vanadium bronze is oxidized to remove sufficient copper ions to yield a compound selected from the group consisting of:
   a) compounds having the formula $\beta\text{-}Cu_yV_2O_5$ wherein $0 < y \leq 0.55$; and
   b) compounds having the formula $\epsilon\text{-}Cu_yV_2O_5$ wherein $0 < y \leq 0.85$.

9. The method according to claim 7
   characterized in that
   said copper vanadium bronze is oxidized to remove sufficient copper ions to yield a compound selected from the group consisting of:
   a) compounds having the formula $\beta\text{-}Cu_yV_2O_5$ wherein $0.05 \leq y \leq 0.1$; and
   b) compounds having the formula $\epsilon\text{-}Cu_yV_2O_5$ wherein $0.1 \leq y \leq 0.4$.

10. The method according to claim 7
    characterized in that
    said copper vanadium bronze is oxidized to remove sufficient copper ions to yield a compound selected from the group consisting of:
    a) a compound having the formula $\beta\text{-}Cu_yV_2O_5$ wherein $y \approx 0.08$; and
    b) a compound having the formula $\epsilon\text{-}Cu_yV_2O_5$ wherein $y \approx 0.2$.

11. The method according to claim 7
    characterized in that
    said copper vanadium bronze is oxidized by mixing with a solution of a copper-oxidizing agent.

12. The method according to claim 11
    characterized in that
    said oxidizing agent is selected from the group consisting of $I_2$, $Br_2$, $NOBF_4$, and $NO_2BF_4$.

13. The method according to claim 12
    characterized in that
    said oxidizing agent is dissolved in a solvent selected from the group consisting of acetonitrile and $CCl_4$.

14. The method according to claim 13
    characterized in that
    said copper vanadium bronze is mixed with said oxidizing agent solution for about 24 hours at a temperature in the range of about 20° to 85° C.

* * * * *